United States Patent
Kumar et al.

(10) Patent No.: US 10,346,749 B2
(45) Date of Patent: Jul. 9, 2019

(54) SYSTEM AND METHOD FOR PROVIDING INTERACTION BETWEEN A USER AND AN EMBODIED CONVERSATIONAL AGENT

(71) Applicant: Wipro Limited, Bangalore (IN)

(72) Inventors: Amit Kumar, Saran (IN); Sheeba Santhosh Raj, Bangalore (IN); Ramprasad Kanakatte Ramanna, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 699 days.

(21) Appl. No.: 15/045,587

(22) Filed: Feb. 17, 2016

(65) Prior Publication Data
US 2017/0178005 A1     Jun. 22, 2017

(30) Foreign Application Priority Data
Dec. 21, 2015  (IN) ............................ 6809/CHE/2015

(51) Int. Cl.
*G06N 5/02*     (2006.01)
*H04M 3/51*     (2006.01)

(52) U.S. Cl.
CPC .......... *G06N 5/022* (2013.01); *H04M 3/5133* (2013.01); *H04M 3/5166* (2013.01); *H04M 2203/1025* (2013.01)

(58) Field of Classification Search
CPC combination set(s) only.
See application file for complete search history.

(56) References Cited

U.S. PATENT DOCUMENTS

| | | | |
|---|---|---|---|
| 6,757,362 B1 | 6/2004 | Cooper et al. | |
| 8,122,093 B2 | 2/2012 | Yu et al. | |
| 8,494,981 B2 | 7/2013 | Harrison et al. | |
| 9,483,768 B2* | 11/2016 | Singh | G06Q 30/016 |
| 9,727,778 B2* | 8/2017 | Madhusudhanan | G06K 9/2054 |
| 9,928,106 B2* | 3/2018 | Hosabettu | G06F 3/0482 |
| 9,977,656 B1* | 5/2018 | Mannopantar | G06F 8/20 |
| 9,990,564 B2* | 6/2018 | Singh | G06K 9/6254 |
| 10,083,686 B2* | 9/2018 | Okabe | H04M 3/4936 |
| 10,242,257 B2* | 3/2019 | Hosabettu | G06K 9/00449 |
| 2015/0045007 A1 | 2/2015 | Cash | |

FOREIGN PATENT DOCUMENTS

WO     2002037474 A1     5/2002

* cited by examiner

*Primary Examiner* — Michael B Holmes
(74) *Attorney, Agent, or Firm* — Pepper Hamilton LLP

(57) ABSTRACT

This disclosure relates generally to human-machine interaction. In one embodiment, an interaction device for providing the interaction between the user and the ECA is disclosed. The interaction device comprises a processor and a memory communicatively coupled to the processor. The memory stores processor instructions, which, on execution, causes the processor to receive conversation data of a user interacting with the ECA, wherein the ECA is presented on an interface of the interaction device. The processor further determines an emotional state of the user based on one or more behavioral parameters associated with the conversation data of the user. The processor identifies a response state for the ECA corresponding to the emotional state of the user, wherein the response state is identified from a plurality of response states based on a pre-defined probability for each response state. The processor further transitions behavior of the ECA based on the response state.

20 Claims, 3 Drawing Sheets

SYSTEM AND METHOD FOR PROVIDING INTERACTION BETWEEN A USER AND AN EMBODIED CONVERSATIONAL AGENT

This application claims the benefit of Indian Patent Application Serial No. 6809/CHE/2015 filed Dec. 21, 2015, which is hereby incorporated by reference in its entirety.

TECHNICAL FIELD

This disclosure relates generally to human-machine interaction, and more particularly to a system and method for providing interaction between a user and an Embodied Conversational Agent (ECA).

BACKGROUND

Human-machine interaction enables a user to communicate with a machine by speaking, typing, or performing gestures to express their interest, requirements, or queries. The human-machine interface may involve use of Embodied Conversational Agents (ECA) as animated characters or avatars to enable a meaningful interaction between a user and the interface.

However, the conventional human-machine interfaces fail to incorporate variations in human behavior, attitude, emotion, and sentiment during the interaction. In addition, the conventional interfaces provide a limited depth in expression while responding to the variations in the human behavior. Thus, the conventional interfaces are jittery in their expressions and interactions, thereby failing to provide an engaging conversation.

Moreover, the conventional interfaces fail to evaluate the human behavior based on context of the interaction. Also, the reaction of the ECA to an input provided by the user is pre-determined for the evaluated human behavior. Therefore, the interfaces are unable to provide a true emotional feedback and a dynamic dialogue.

SUMMARY

In one embodiment, a method for providing an interaction between a user and an embodied conversational agent (ECA), is disclosed. The method comprises receiving, by an interaction device, conversation data of a user interacting with the ECA, wherein the ECA is presented on an interface of the interaction device. The method further comprises determining, by the interaction device, an emotional state of the user based on one or more behavioral parameters associated with the conversation data of the user. The method comprises identifying, by the interaction device, a response state for the ECA corresponding to the emotional state of the user, wherein the response state is identified from a plurality of response states based on a pre-defined probability for each response state. The method further comprises transitioning, by the interaction device, behavior of the ECA based on the response state.

In one embodiment, an interaction device for providing an interaction between a user and an embodied conversational agent (ECA), is disclosed. The interaction device comprises a processor and a memory communicatively coupled to the processor. The memory stores processor instructions, which, on execution, causes the processor to receive conversation data of a user interacting with the ECA, wherein the ECA is presented on an interface of the interaction device. The processor further determines an emotional state of the user based on one or more behavioral parameters associated with the conversation data of the user. The processor identifies a response state for the ECA corresponding to the emotional state of the user, wherein the response state is identified from a plurality of response states based on a pre-defined probability for each response state. The processor further transitions behavior of the ECA based on the response state.

In one embodiment, a non-transitory computer-readable medium storing computer-executable instructions is disclosed. The instructions comprises receiving conversation data of a user interacting with the ECA, wherein the ECA is presented on an interface of the interaction device and determining an emotional state of the user based on one or more behavioral parameters associated with the conversation data of the user. Further, the instructions comprises identifying a response state for the ECA corresponding to the emotional state of the user, wherein the response state is identified from a plurality of response states based on a pre-defined probability for each response state and transitioning behavior of the ECA based on the response state.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for providing an interaction between a user and an Embodied Conversational Agent (ECA). The system and method may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the system and method may be implemented in other computing systems, albeit with a few variations, as will be understood by a person skilled in the art.

Figure 1:
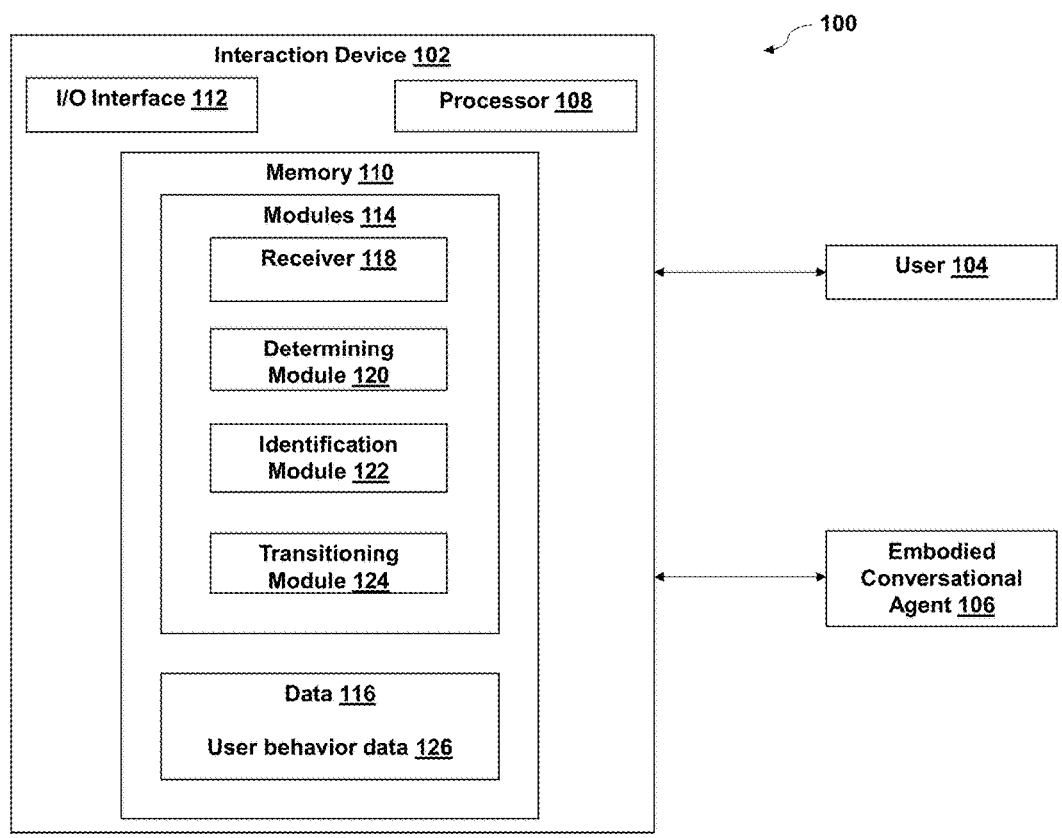
FIG. 1 illustrates an exemplary network implementation comprising an interaction device for providing an interaction between a user and an Embodied Conversational Agent (ECA), according to some embodiments of the present disclosure.
Figure 2:
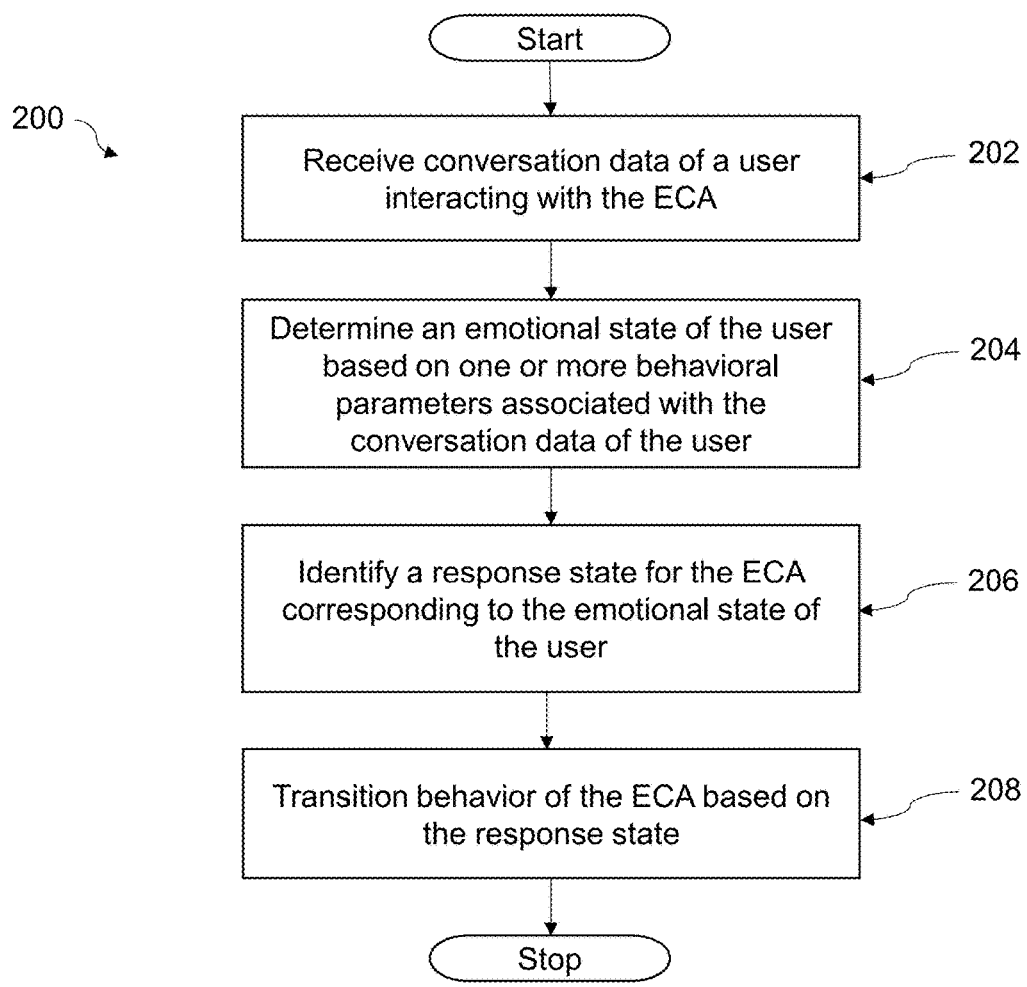
FIG. 2 is a flow diagram illustrating a method for providing an interaction between a user and the ECA, in accordance with some embodiments of the present disclosure.
Figure 3:
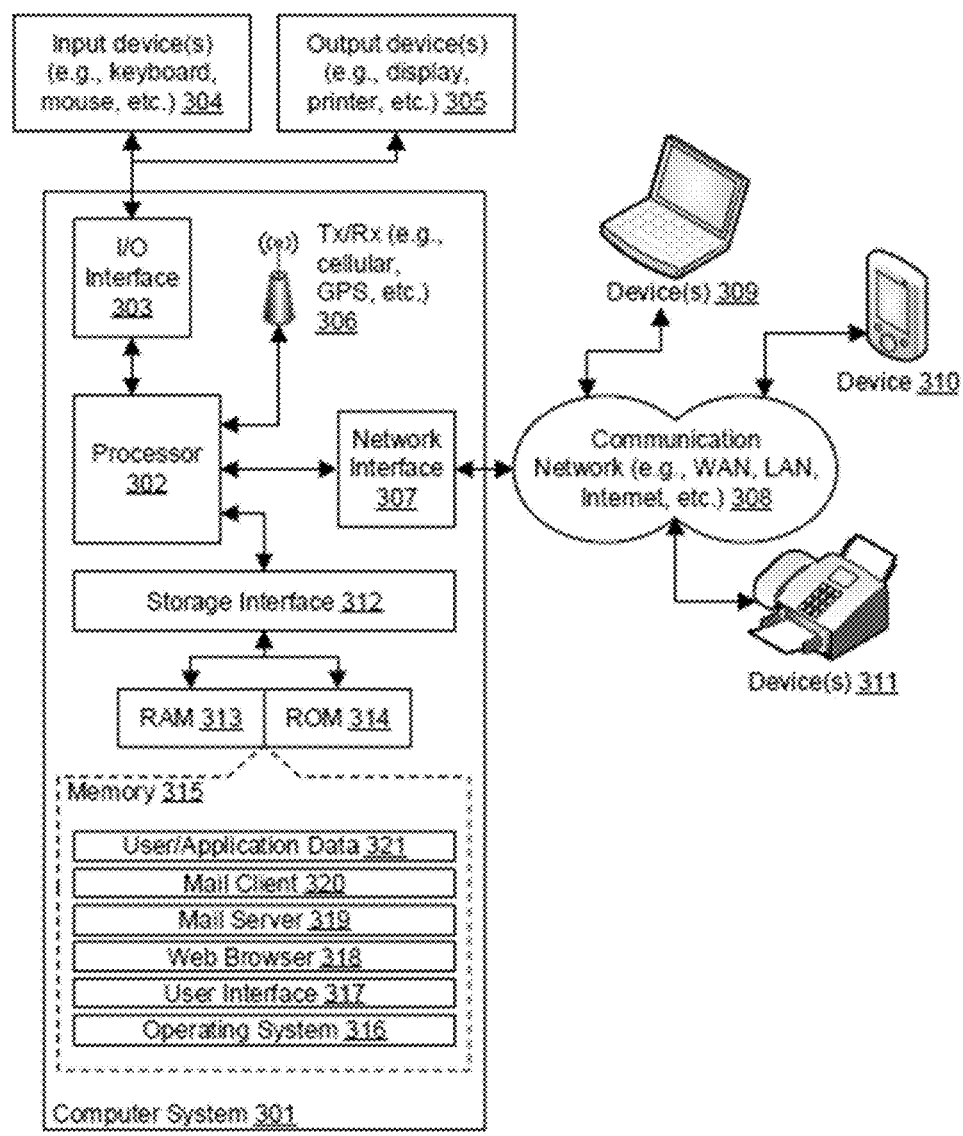
FIG. 3 is a block diagram of an exemplary computer system for implementing embodiments consistent with the present disclosure.

Working of the system and method for providing the interaction between the user and the ECA is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network implementation 100 comprising an interaction device 102 for providing an interaction between a user 104 and an Embodied Conversational Agent (ECA) 106, according to some embodiments of the present disclosure. As shown in the FIG. 1, the user 104 may interact with the ECA 106 by means of the interaction device 102. In one implementation, the ECA 106 may be presented on an interface of the interaction device 102.

As shown in the FIG. 1, the interaction device 102 comprises a processor 108, a memory 110 coupled to the processor 108, and input/output (I/O) interface(s) 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The I/O interface(s) 112 may include a variety of software and hardware interfaces, for example, a web interface, a graphical user interface, etc., allowing the interaction device 102 to interact with user devices. Further, the I/O interface(s) 112 may enable the interaction device 102 to communicate with other computing devices. The I/O interface(s) 112 can facilitate multiple communications within a wide variety of networks and protocol types, including wired networks, for example LAN, cable, etc., and wireless networks such as WLAN, cellular, or satellite. The I/O interface(s) 112 may include one or more ports for connecting a number of devices to each other or to another server.

In one implementation, the memory 110 includes modules 114 and data 116. In one example, the modules 114, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the data 116 serves, amongst other things, as a repository for storing data fetched, processed, received and generated by one or more of the modules 114. In one implementation, the data 116 may include user behavior data 126. In one embodiment, the data 116 may be stored in the memory 110 in the form of various data structures. Additionally, the aforementioned data can be organized using data models, such as relational or hierarchical data models. In an example, the data 116 may also comprise other data used to store data, including temporary data and temporary files, generated by the modules 114 for performing the various functions of the interaction device 102.

In one implementation, the modules 114 may further include a receiver 118, a determining module 120, an identification module 122, and a transitioning module 124. In an example, the modules 114 may also comprises other modules. The other modules may perform various miscellaneous functionalities of the interaction device 102. It will be appreciated that such aforementioned modules may be represented as a single module or a combination of different modules.

In order to provide an interaction between the user 104 and the ECA 106, the receiver 118 may receive conversation data of the user 104 interacting with the ECA 106. The conversation data may include audio data, visual data, textual data, or a combination thereof. The audio data may include dialogues spoken by the user 104. The visual data may include, but is not limited to, facial expressions of the user 104 and gestures performed by the user 104 to interact with the ECA 106. Further, the textual data may include, but is not limited to, the data keyed in by the user 104 or uploaded as a document through the I/O interface 112 of the interaction device 102.

After receiving the conversation data, the determining module 120 may determine an emotional state of the user 104 based on one or more behavioral parameters associated with the conversation data of the user 104. The one or more behavioral parameters may comprise, conversation sentiment, audio sentiment, facial expression of the user, and historical user behavior data.

The conversation sentiment may be determined by the determining module 120 from the textual data. The conversation sentiment may be extracted using standard natural language processing algorithms. In one implementation, the conversation sentiment may be determined based on connotation of words, negations used in sentences, modifiers used in the sentences, or the like. For example, if the sentence is "the car is good" the conversation sentiment may be determined as positive. Also, if the sentence is "the car is not good", the conversation sentiment may be determined as negative. In another example, if the sentence "the car is good" is modified to "the car is really good", the conversation sentiment may be determined as "highly positive". In another example, if the words used in the sentences have a neutral connotation, then the conversation sentiment may be determined as 'mixed'. Thus, the conversation sentiment may be determined as one of highly positive, positive, mixed, negative, and highly negative.

After determining the conversation sentiment, the determining module 120 may compute a conversation sentiment score for the conversation sentiment. The conversation sentiment score may vary between '0' to '1'. The conversation sentiment score of '0' may indicate 'a highly negative' conversation sentiment and the conversation sentiment score of '1' may indicate 'a highly positive' conversation sentiment.

In addition to determining the conversation sentiment, the determining module 120 may determine the audio sentiment from the audio data by analyzing variations in pitch of voice of the user. For example, if the pitch of the voice is high, the audio sentiment may be determined as one of frightened or excited. The audio sentiment may be determined as one of frightened or excited by comparing the pitch of the voice with a pre-defined pitch range. In some implementations, the audio sentiment may also be determined based on the tone of the voice. The tone of the voice may be determined based on connotation of words, negations used in sentences, modifiers used in the sentences, or the like. Thus, the tone of the voice may be determined as one of highly positive, positive, mixed, negative, or highly negative.

After determining the audio sentiment, the determining module 120 may compute an audio sentiment score for the audio sentiment. The audio sentiment score may vary between '0' and '1'. The audio sentiment score of '0' may indicate 'a highly negative' audio sentiment and the audio sentiment score of '1' may indicate 'a highly positive' audio sentiment.

In addition to determining the conversation sentiment and the audio sentiment, the determining module 120 may determine the facial expression of the user from the facial images using standard facial recognition techniques. For example, the determining module 120 may determine direction of user's gaze from multiple facial images. The determining module 120 may further determine a facial expression score based on the facial expressions of the user. The facial expression score may be determined from the facial expressions of the user based on a pre-defined model mapping a facial expression with a score.

In some implementations, the determining module 120 may determine the emotional state of the user 104 based on the historical user behavior data. The historical user behavior data may be retrieved from the memory 110. The historical user behavior data may include one or more user behavior scores for previous conversations between the user 104 and the ECA 106. After retrieving the one or more user behavior scores for previous conversations, the determining module 120 may compute a historical user behavior score by computing an average of the one or more user behavior scores.

In order to determine the emotional state of the user, the determining module 120 may compute a user behavior score based on a weightage assigned to each behavioral parameter of the one or more behavioral parameters. The one or more behavioral parameters may include the conversation sentiment, audio sentiment, facial expressions, and the historical user behavior data. The weightage may be pre-defined for each behavioral parameter and may be retrieved from the data 116 stored in the memory 110. The determining module 120 may compute a weighted average of the conversation sentiment score, the audio sentiment score, the facial expression score, and the historical user behavior score to compute the user behavior score. In order to determine the emotional state of the user, the determining module 120 may compare the user behavior score with a pre-defined user behavior score. In some implementations, the user behavior score may be compared with the pre-defined user behavior score based on an emotion mapping table. In an example, the emotion mapping table is as shown below.

| Pre-defined User Behavior Score | Emotional State | Type of Emotional State |
|---|---|---|
| 2-1.750 | Passion | Positive |
| 1.750-1.500 | Joy | |
| 1.500-1.250 | Happiness | |
| 1.250-1.00 | Surprise | |
| 1.00-0.924 | Contempt | Negative |
| 0.924-0.847 | Disgust | |
| 0.847-0.770 | Shame | |
| 0.770-0.693 | Anxiety | |
| 0.693-0.616 | Guilt | |
| 0.616-0.539 | Distress | |
| 0.539-0.462 | Stressed | |
| 0.462-0.385 | Frustrated | |
| 0.385-0.308 | Disappointment | |
| 0.308-0.231 | Pain | |
| 0.231-0.154 | Sadness | |
| 0.154-0.077 | Terrified | |
| 0.077-0 | Scared | |

Referring to the emotion mapping table, a mapping between the emotional state of the user 104 and corresponding range of pre-defined user behavior score is provided. In an example, if the user behavior score is 0.739, the emotional state corresponding to the user behavior score may be determined as 'Anxiety'. In some implementations, the emotion mapping table may be created based on a maximum limit and a minimum limit of the user behavior score. In one example, consider that the maximum limit is '2' and the minimum limit is '0'. Further, the determining module 120 may compute a mean of the maximum limit and the minimum limit. The determining module 120 may divide a difference between the mean and the maximum point by a pre-defined number of positive emotions. Thus, if the pre-defined number of positive emotions are 4, then an interval between the user behavior score for each positive emotion may be '0.25'. Similarly, the determining module 120 may divide a difference between the mean and the minimum point by a pre-defined number of negative emotions. Thus, if the pre-defined number of negative emotions is 13, then an interval between the user behavior score for each negative emotion may be '0.77'.

After determining the emotional state of the user, the identification module 122 may identify a response state for the ECA 106 corresponding to the emotional state of the user. The response state for the ECA may be identified from a plurality of response states based on a pre-defined probability for each response state. The plurality of response states corresponding to the emotional state may be determined based on a pre-defined response matrix. In an example, the pre-defined response matrix is as shown below.

| | | ECA | | | | | | | | | |
|---|---|---|---|---|---|---|---|---|---|---|---|
| | | Scared | Terrified | Nervous/Worried | Sadness | Pain | Disappointed | Frustrated | Stressed | Distress | Anxiety | Shame |
| User | Scared | 1 | 1 | 1 | 1 | 1 | 1 | 0 | 0 | 0 | 0 | 0 |
| | Terrified | 1 | 1 | 1 | 0 | 1 | 1 | 0 | 1 | 1 | 0 | 0 |
| | Anger | 1 | 0 | 1 | 1 | 1 | 1 | 1 | 1 | 1 | 0 | 1 |

-continued

|  | | | | | | | | | | | |
|---|---|---|---|---|---|---|---|---|---|---|---|
| Sadness | 0 | 0 | 1 | 1 | 1 | 1 | 1 | 1 | 1 | 1 | 1 |
| Pain | 1 | 1 | 1 | 1 | 1 | 1 | 1 | 1 | 1 | 0 | 0 |
| Disappointed | 1 | 0 | 1 | 1 | 1 | 1 | 1 | 1 | 0 | 0 | 0 |
| Frustrated | 0 | 0 | 1 | 0 | 0 | 1 | 1 | 1 | 0 | 0 | 0 |
| Stressed | 0 | 0 | 1 | 1 | 1 | 1 | 1 | 1 | 1 | 0 | 0 |
| Distress | 0 | 0 | 1 | 0 | 0 | 1 | 1 | 0 | 0 | 0 | 0 |
| Guilt | 0 | 0 | 1 | 0 | 0 | 0 | 1 | 1 | 1 | 0 | 0 |
| Anxiety | 0 | 0 | 1 | 0 | 0 | 0 | 0 | 0 | 0 | 1 | 0 |
| Shame | 0 | 0 | 1 | 0 | 0 | 0 | 0 | 0 | 0 | 0 | 1 |
| Disgust | 0 | 0 | 1 | 0 | 0 | 1 | 1 | 1 | 0 | 0 | 1 |
| Contempt | 0 | 0 | 0 | 0 | 0 | 1 | 0 | 1 | 0 | 0 | 1 |
| Surprise | 0 | 0 | 0 | 0 | 0 | 0 | 0 | 0 | 0 | 0 | 0 |
| Happiness | 0 | 0 | 0 | 0 | 0 | 0 | 0 | 0 | 0 | 0 | 0 |
| Joy | 0 | 0 | 0 | 0 | 0 | 0 | 0 | 0 | 0 | 0 | 0 |
| Passion | 0 | 0 | 0 | 0 | 0 | 0 | 0 | 0 | 0 | 0 | 0 |

| | | ECA | | | | | | | | | |
|---|---|---|---|---|---|---|---|---|---|---|---|
| | | Disgust | Confused | Puzzled | Shocked | Bored/Lazy | Contempt | Surprise | Happiness | Joy | Amused | Passion |
| User | Scared | 0 | 1 | 1 | 1 | 0 | 0 | 0 | 0 | 0 | 0 | 0 |
| | Terrified | 0 | 0 | 0 | 1 | 0 | 0 | 1 | 0 | 0 | 0 | 0 |
| | Anger | 1 | 0 | 1 | 1 | 0 | 1 | 1 | 0 | 0 | 0 | 0 |
| | Sadness | 1 | 0 | 1 | 1 | 0 | 0 | 0 | 0 | 0 | 0 | 0 |
| | Pain | 0 | 0 | 0 | 0 | 0 | 0 | 0 | 0 | 0 | 0 | 0 |
| | Disappointed | 0 | 1 | 1 | 1 | 0 | 0 | 0 | 0 | 0 | 0 | 0 |
| | Frustrated | 0 | 1 | 1 | 0 | 0 | 0 | 0 | 0 | 0 | 0 | 0 |
| | Stressed | 0 | 1 | 0 | 0 | 0 | 0 | 0 | 0 | 0 | 0 | 0 |
| | Distress | 0 | 1 | 0 | 1 | 0 | 0 | 0 | 0 | 0 | 0 | 0 |
| | Guilt | 0 | 1 | 1 | 1 | 0 | 0 | 1 | 0 | 0 | 0 | 0 |
| | Anxiety | 0 | 1 | 1 | 1 | 0 | 0 | 1 | 0 | 0 | 0 | 0 |
| | Shame | 1 | 0 | 1 | 1 | 0 | 0 | 1 | 0 | 0 | 0 | 0 |
| | Disgust | 1 | 1 | 1 | 1 | 1 | 0 | 1 | 0 | 0 | 0 | 0 |
| | Contempt | 0 | 1 | 1 | 1 | 0 | 0 | 1 | 1 | 0 | 0 | 0 |
| | Surprise | 0 | 1 | 1 | 1 | 1 | 0 | 1 | 1 | 1 | 1 | 1 |
| | Happiness | 0 | 0 | 0 | 0 | 1 | 0 | 1 | 1 | 1 | 1 | 1 |
| | Joy | 0 | 0 | 0 | 0 | 0 | 0 | 1 | 1 | 1 | 1 | 1 |
| | Passion | 0 | 0 | 0 | 0 | 1 | 0 | 1 | 1 | 1 | 1 | 1 |

As shown in the pre-defined response matrix, if the emotional state of the user 104 is 'Anxiety', then the plurality of response states for the ECA, corresponding to 'Anxiety' may be determined as 'Nervous/Worried', 'Anxiety', 'Confused', 'Puzzled', 'Shocked', and 'Surprise'. Further, each response state of the plurality of response states may be assigned the pre-defined probability. In an example, the pre-defined probability for each response state of the plurality of response states for 'Anxiety' may be as shown below.

| | Nervous/Worried | Anxiety | Confused | Puzzled | Shocked | Surprised |
|---|---|---|---|---|---|---|
| Anxiety | 0.25 | 0.2 | 0.05 | 0.15 | 0.2 | 0.15 |

In order to identify the response state for the ECA corresponding to the emotional state of the user, the identification module 122 may perform a Monte Carlo sampling on pre-defined probabilities of the plurality of response states. In some implementations, the pre-defined probabilities may be distributed in an interval of '0' to '1'. Thus, the pre-defined probabilities for the plurality of response states corresponding to the emotional state of 'Anxiety' may be distributed as shown below.

| Pre-defined probability interval | Response State |
|---|---|
| 0-0.25 | Nervous/Worried |
| 0.25-0.45 | Anxiety |
| 0.45-0.50 | Confused |
| 0.50-0.65 | Puzzled |
| 0.65-0.85 | Shocked |
| 0.85-1 | Surprised |

After distributing the pre-defined probabilities over an interval, the identification module 122 may generate a random number between '0' to '1'. Further, the random number may be mapped with the pre-defined probability interval to identify the response state for the ECA. In an example, if the random number generated is '0.19', then the corresponding pre-defined probability interval is '0-0.25'. As the response state corresponding to the interval '0-0.25' is 'Nervous/Worried', the response state for the ECA may be identified as 'Nervous/Worried'. Thus, the response state for the ECA corresponding to the emotional state of the user may be determined dynamically by selecting the response state from a plurality of probable response states. The emotional state of the user may correspond to one or more probable response states. Therefore, dynamically selecting one response state from the one or more probable response states based on a pre-defined probability provides natural emulation of user behavior.

Upon identifying the response state for the ECA 106 corresponding to the emotional state of the user, the transitioning module 124 may transition behavior of the ECA 106 based on the response state.

In some implementations, the transitioning module 124 may transition the behavior of the ECA 106 by transitioning visual appearance of the ECA 106. The visual appearance of the ECA 106 may be transitioned by modifying at least one of facial expression of the ECA 106 and one or more gestures of the ECA 106. In order to transition the visual appearance of the ECA 106, the transitioning module 124 may determine an appearance transition sequence for the response state by mapping the response state with a pre-defined appearance transition matrix. The appearance transition sequence may comprise one or more appearance transitions. In an example, the pre-defined appearance transition matrix may be as shown below.

|  | TC1 | TC2 | TC3 | TC4 | TC5 | TC6 | — | TCn |
|---|---|---|---|---|---|---|---|---|
| Scared | 0 | 1 | 0 | 1 | 0 | 0 | — | 0 |
| Terrified | 1 | 0 | 0 | 0 | 1 | 0 | — | 1 |
| Nervous/Worried | 0 | 1 | 0 | 1 | 0 | 1 | — | 0 |
| Sadness | 1 | 0 | 0 | 0 | 1 | 0 | — | 1 |
| Pain | 1 | 0 | 1 | 1 | 0 | 0 | — | 0 |
| Frustrated | 0 | 1 | 1 | 0 | 1 | 1 | — | 0 |
| Stressed | 0 | 1 | 0 | 0 | 0 | 1 | — | 0 |
| Distress | 0 | 1 | 1 | 0 | 0 | 1 | - - - | 1 |
| Anxiety | 0 | 1 | 0 | 1 | 1 | 0 | — | 0 |
| Shame | 1 | 0 | 0 | 0 | 1 | 1 | — | 1 |
| Disgust | 1 | 0 | 1 | 1 | 0 | 0 | — | 0 |
| Confused | 1 | 1 | 0 | 1 | 1 | 0 | — | 1 |
| Puzzled | 0 | 0 | 1 | 0 | 0 | 1 | — | 0 |
| Shocked | 0 | 1 | 1 | 0 | 1 | 1 | — | 0 |
| Bored/Lazy | 1 | 0 | 1 | 1 | 0 | 1 | — | 1 |
| Contempt | 1 | 0 | 0 | 1 | 1 | 0 | — | 0 |
| Surprise | 0 | 1 | 1 | 0 | 1 | 0 | — | 1 |
| Happiness | 0 | 0 | 1 | 1 | 0 | 0 | — | 1 |
| Joy | 1 | 1 | 0 | 0 | 1 | 1 | — | 0 |
| Passion | 1 | 0 | 1 | 1 | 0 | 0 | — | 1 |

In an example, consider that the response state is identified as 'Nervous/Worried' corresponding to the emotional state 'Anxiety'. The appearance transition sequence for the response state 'Nervous/Worried' may be determined as TC2, TC4, and TC6 by referring to the pre-defined transition matrix, where TC2, TC4, and TC6 may be the appearance transitions. The definition for the appearance transition may be determined based on a transition definition table shown below.

|  | Lips | Mouth | Eyes | Eyebrow | Cheeks | Chest | Shoulder | — | Hip/Torso |
|---|---|---|---|---|---|---|---|---|---|
| Outer | TC1 | TC11 | TC6 | TC16 | TC21 | TC46 | TC51 | TC56 | TC(n − 4) |
| Mid | TC2 | TC7 | TC12 | TC17 | TC22 | TC47 | TC52 | TC57 | TC(n − 3) |
| Center | TC3 | TC8 | TC13 | TC18 | TC23 | TC48 | TC53 | TC58 | TC(n − 2) |
| In | TC4 | TC9 | TC14 | TC19 | TC24 | TC49 | TC54 | TC59 | TC(n − 1) |
| Out | TC5 | TC10 | TC15 | TC20 | TC25 | TC50 | TC55 | TC60 | TCn |

The appearance transition sequence for the response state 'Nervous/Worried' may be determined as 'TC2—Mid, Lip', 'TC4—In, Lip', and 'TC6—Outer, Eye' based on the transition definition table. After determining the appearance transition sequence, the transitioning module 124 may apply the appearance transition sequence on the ECA 106 to transition the behavior of the ECA 106. Therefore, current behavior of the ECA 106 may be transitioned to reflect 'Nervous/Worried' by applying 'Mid, Lip', followed by 'In, Lip', and 'Outer, Eye'.

In some implementations, the transitioning module 124 may transition the behavior of the ECA 106 by modulating voice of the ECA 106. The voice of the ECA 106 may be modulated by modifying at least one of pitch, volume of speech, speed of the speech, tone of the speech, and pause between words or statements in the speech. In one example, if the response state of the ECA 106 is identified as 'Nervous/Worried', the pitch of the voice and the speed of the speech may be decreased. Similarly, the volume of the speech may be increased and the pause between words or statements in the speech may be increased to reflect nervousness in the speech. Further, the tone of the speech may be modified to introduce words with negative connotation.

In some implementations, the transitioning module 124 may transition the behavior of the ECA 106 by modifying the visual appearance and by modulating the voice of the ECA 106. In one example, if the response state of the ECA 106 is identified as 'Nervous/Worried', the transitioning module 124 may apply the appearance transition sequence corresponding to 'Nervous/Worried' and modulate the voice of the ECA 106 to reflect the emotion of being 'Nervous/Worried'.

FIG. 2 is a flow diagram illustrating a method 200 for providing interaction between the user 104 and the ECA 106, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, conversation data of a user 104 interacting with the ECA 106 may be received. The ECA 106 is presented on an interface of the interaction device 102. The conversation data of the user 104 may be received by the receiver 118. The receiving of the conversation data of the user 104 is explained in detail in conjunction with FIG. 1.

At block 204, an emotional state of the user 104 may be determined based on one or more behavioral parameters associated with the conversation data of the user 104. The one or more behavioral parameters may comprise facial expression of the user, conversation sentiment, audio sentiment, and historical user behavior data. In order to determine the emotional state of the user 104, a user behavior score may be computed based on a weightage assigned to each behavioral parameter of the one or more behavioral parameters. Further, the emotional state of the user 104 may be determined by comparing the user behavior score with a pre-defined user behavior score. In some implementations, the emotional state of the user 104 may be determined by the determining module 120. The determining of the emotional state of the user 104 is explained in detail in conjunction with FIG. 1.

At block 206, a response state for the ECA 106 corresponding to the emotional state of the user 104 may be identified. The response state may be identified from a plurality of response states based on a pre-defined probability for each response state. In order to identify the response state, the plurality of response states corresponding to the emotional state may be determined based on a pre-defined response matrix. Each response state of the plurality of response states may be assigned the pre-defined probability. Further, the response state may be identified from the plurality of response states by performing a Monte Carlo sampling on pre-defined probabilities of the plurality of response states. In some implementations, the response state may be identified by the identification module 120. The identifying of the response state for the ECA 106 is explained in detail in conjunction with FIG. 1.

At block 208, behavior of the ECA 106 may be transitioned based on the response state. In some implementations, the behavior of the ECA 106 may be transitioned by transitioning visual appearance of the ECA 106. In order to transition the visual appearance of the ECA 106 an appearance transition sequence for the response state may be determined by mapping the response state with a pre-defined appearance transition matrix. The appearance transition sequence comprises one or more appearance transitions. Further, the behavior of the ECA 106 may be transitioned by applying the appearance transition sequence on the ECA 106.

In some implementations, the behavior of the ECA 106 may be transitioned by modulating voice of the ECA 106. The voice of the ECA 106 may be modulated by modifying at least one of pitch, volume of speech, speed of the speech, tone of the speech, and pause between words or statements in the speech. The behavior of the ECA 106 may be transitioned by the transitioning module 124. The transitioning of the behavior of the ECA 106 is explained in detail in conjunction with FIG. 1.

Computer System

FIG. 3 is a block diagram of an exemplary computer system for implementing embodiments consistent with the present disclosure. Variations of computer system 301 may be used for implementing the receiver 118, the determining module 120, the identification module 122, and the transitioning module 124. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for providing interaction between the user 104 and the ECA 106. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing an interaction between a user and an embodied conversational agent (ECA), the method comprising:
   receiving, by an interaction device, conversation data of a user interacting with the ECA, wherein the ECA is presented on an interface of the interaction device;
   computing, by the interaction device, a user behavior score based on a weightage assigned to each behavioral parameter of one or more behavioral parameters associated with the conversation data of the user;
   determining, by the interaction device, an emotional state of the user based on the user behavior score;
   identifying, by the interaction device, a response state for the ECA corresponding to the emotional state of the user, wherein the response state is identified from a plurality of response states based on a pre-defined probability for each response state; and
   transitioning, by the interaction device, behavior of the ECA based on the response state.

2. The method of claim 1, wherein the one or more behavioral parameters comprises facial expression of the user, conversation sentiment, audio sentiment, and historical user behavior data.

3. The method of claim 1, wherein determining the emotional state of the user further comprises:
  comparing the user behavior score with a pre-defined user behavior score.

4. The method of claim 1, wherein identifying the response state for the ECA corresponding to the emotional state of the user comprises:
  determining the plurality of response states corresponding to the emotional state based on a pre-defined response matrix, wherein each response state of the plurality of response states is assigned the pre-defined probability; and
  identifying the response state from the plurality of response states by performing a Monte Carlo sampling on pre-defined probabilities of the plurality of response states.

5. The method of claim 1, wherein transitioning the behavior of the ECA comprises transitioning visual appearance of the ECA.

6. The method of claim 5, wherein transitioning the visual appearance of the ECA comprises modifying at least one of facial expression of the ECA and one or more gestures of the ECA.

7. The method of claim 5, wherein transitioning the visual appearance of the ECA comprises:
  determining an appearance transition sequence for the response state by mapping the response state with a pre-defined appearance transition matrix, wherein the appearance transition sequence comprises one or more appearance transitions; and
  applying the appearance transition sequence on the ECA to transition the behavior of the ECA.

8. The method of claim 1, wherein transitioning the behavior of the ECA comprises modulating voice of the ECA by modifying at least one of pitch, volume of speech, speed of the speech, tone of the speech, and pause between words or statements in the speech.

9. An interaction device comprising:
  a processor; and
  a memory communicatively coupled to the processor, wherein the memory stores processor instructions, which, on execution, causes the processor to:
    receive conversation data of a user interacting with the ECA, wherein the ECA is presented on an interface of the interaction device;
    compute a user behavior score based on a weightage assigned to each behavioral parameter of one or more behavioral parameters associated with the conversation data of the user;
    determine an emotional state of the user based on the user behavior score;
    identify a response state for the ECA corresponding to the emotional state of the user, wherein the response state is identified from a plurality of response states based on a pre-defined probability for each response state; and
    transition behavior of the ECA based on the response state.

10. The interaction device of claim 9, wherein the one or more behavioral parameters comprises facial expression of the user, conversation sentiment, audio sentiment, and historical user behavior data.

11. The interaction device of claim 9, wherein the processor is configured to:
  determine the emotional state of the user by comparing the user behavior score with a pre-defined user behavior score.

12. The interaction device of claim 9, wherein the processor is configured to:
  determine the plurality of response states corresponding to the emotional state based on a pre-defined response matrix, wherein each response state of the plurality of response states is assigned the pre-defined probability; and
  identify the response state from the plurality of response states by performing a Monte Carlo sampling on pre-defined probabilities of the plurality of response states.

13. The interaction device of claim 9, wherein the processor is configured to transition the behavior of the ECA by transitioning visual appearance of the ECA.

14. The interaction device of claim 13, wherein the processor is configured to transition the visual appearance of the ECA by modifying at least one of facial expression of the ECA and one or more gestures of the ECA.

15. The interaction device of claim 14, wherein the processor is configured to:
  determine an appearance transition sequence for the response state by mapping the response state with a pre-defined appearance transition matrix, wherein the appearance transition sequence comprises one or more appearance transitions; and
  apply the appearance transition sequence on the ECA to transition the behavior of the ECA.

16. The interaction device of claim 9, wherein transitioning the behavior of the ECA comprises modulating voice of the ECA by modifying at least one of pitch, volume of speech, speed of the speech, tone of the speech, and pause between words or statements in the speech.

17. A non-transitory computer-readable medium storing computer-executable instructions for:
  receiving conversation data of a user interacting with the ECA, wherein the ECA is presented on an interface of the interaction device;
  computing a user behavior score based on a weightage assigned to each behavioral parameter of one or more behavioral parameters associated with the conversation data of the user;
  determining an emotional state of the user based on the user behavior score;
  identifying a response state for the ECA corresponding to the emotional state of the user, wherein the response state is identified from a plurality of response states based on a pre-defined probability for each response state; and
  transitioning behavior of the ECA based on the response state.

18. The non-transitory computer-readable medium of claim 17, wherein the one or more behavioral parameters comprises facial expression of the user, conversation sentiment, audio sentiment, and historical user behavior data.

19. The non-transitory computer-readable medium of claim 17, wherein the instructions for determining the emotional state of the user further comprise:
  comparing the user behavior score with a pre-defined user behavior score.

20. The non-transitory computer-readable medium of claim 17, wherein the instructions for identifying the response state for the ECA corresponding to the emotional state of the user comprises:

determining the plurality of response states corresponding to the emotional state based on a pre-defined response matrix, wherein each response state of the plurality of response states is assigned the pre-defined probability; and identifying the response state from the plurality of response states by performing a Monte Carlo sampling on pre-defined probabilities of the plurality of response states.

\* \* \* \* \*